Patented Dec. 26, 1933

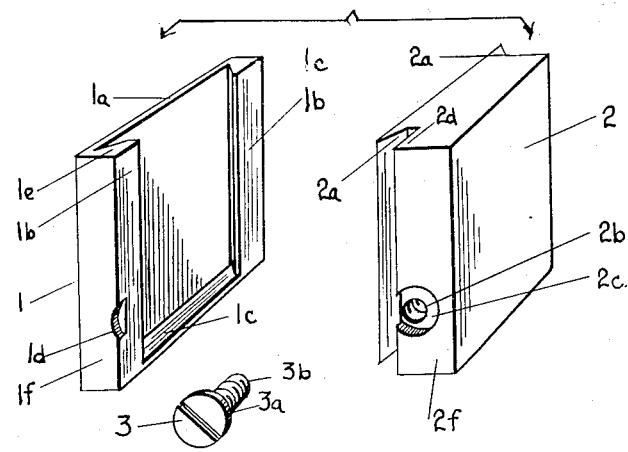
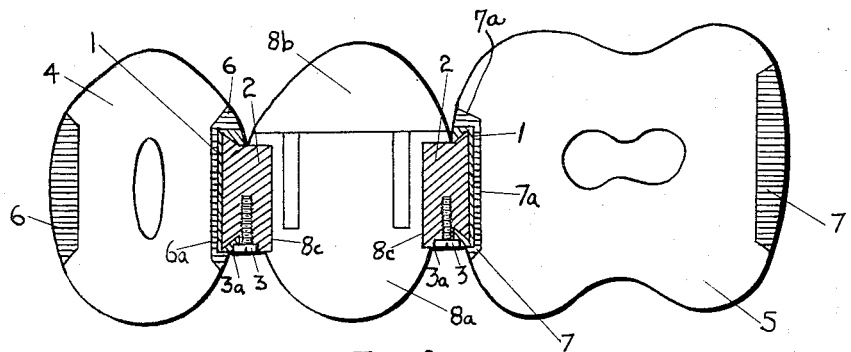
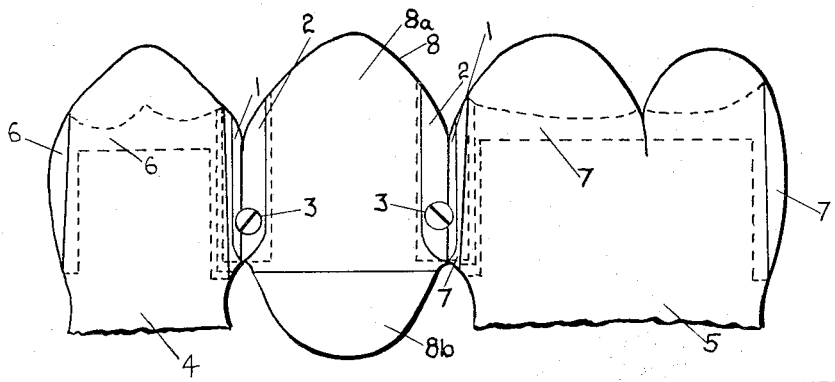

1,941,096

UNITED STATES PATENT OFFICE 1,941,096

DENTAL BRIDGE

Mervyn C. Lasky, Hollywood, Calif.

Application February 20, 1931. Serial No. 517,143

2 Claims. (Cl. 32—12)

My invention represents improvements on my Patents #1,737,164 and #1,749,493 relating to dental bridges and more particularly to that class of dental bridges known as fixed bridges, but bridges in which the artificial teeth are removable from the restorations in the abutment teeth without removing or mutilating said restorations in the abutment teeth: this removal being possible only by a dentist, not by the patient.

The objects of my invention are: first, to provide a dental bridge of this class which is substantially a fixed bridge but which may be removed by a dentist for repair or cleaning purposes; second, to provide a bridge of this class which may be easily mounted in position and secured in place either rigidly with the supporting teeth or slightly movable with respect thereto, to permit the natural movement of the teeth in action; third, to provide a bridge of this class in which each abutment restoration for the natural supporting teeth is cemented in its tooth individually so no outside force can prevent proper seating in the natural tooth; fourth, to provide a bridge of this class in which the bridge is secured to the natural teeth by screws constructed with heads larger than the threaded portion, the heads fitting into countersunk receptacles securing the bridge to the natural teeth in such a manner that slight movement in various directions may be provided if desired, the positioning of the screw also providing a very economical construction; fifth, to provide as an article of manufacture sets of connecting, interlocking, retaining and supporting members in the form of male and female members and screws which may be separately secured to restorations in permanent teeth and to an artificial tooth, or teeth, so that the artificial teeth may be removably mounted on the natural teeth, and whereby the fitting of the one relative to the other may be accomplished in a minimum amount of time and with the expenditure of little effort; sixth, to provide members of this class which are applicable for either posterior or anterior bridges and for upper and lower bridges; seventh, to provide a mounting of this class for semi-fixed bridges whereby bridges may be mounted on vital teeth and on inlays therein and are not limited to being mounted on devitalized teeth crowns, or other similar restorations; eighth, to provide as a whole a novelly constructed bridge of this class and novel means for mounting the same on natural teeth; and, ninth, to provide a bridge and means of this class which are very simple and economical of construction, durable, efficient and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawing and to the characters of reference thereon which form a part of this application in which:

Figure I is a perspective view of a pair of the connecting members and screw. Fig. II is a sectional plan view taken through the centers of the screws of a bridge constructed with two complete bridge members as shown in Fig. I. Fig. III is a view of the same constructed bridge from the lingual aspect thereof.

Like characters of reference refer to similar parts and portions throughout the views of the drawing.

The means for connecting, supporting and mounting of my bridge to the permanent teeth consists preferably and primarily of a socket member 1, a male member 2 and a screw 3. The socket member 1 consists of a back wall 1a, lateral portions 1e forming acute angles with back wall 1a, forming a longitudinal recess of dovetail cross section, said recess being open at its upper end, and a bottom plate 1c forming the bottom of the recess, the bottom plate 1c being integrally secured to back plate 1a and lateral portions 1e. The outer surface 1b of lateral portion 1e is parallel to back wall 1a and at right angles to the lingual surface 1f. The countersunk receptacle or recess 1d is cut from the lingual surface 1f inwardly toward the buccal and is segmental in cross section and made to receive a portion of the head of screw 3. This recess is formed with the recess 2c in the male member 2, when members 1 and 2 are positioned together in interlocked relation. The male member 2 is a solid metal member in the form of a plug which is adapted to fit into the recess of the socket member. This male or plug member is provided at its lateral edges and at the one side thereof with longitudinal ribs 2a forming a dovetail tenon which is adapted to be enclosed by the portions 1e. The lower end of the member 2, when mounted on or in the socket member, rests on the bottom plate 1c. The lingual portion 2d of the member 2 is adapted to fit in contact with lateral portion 1e of member 1, the surface 2e being in contact with surface 1b and the surface 2f being flush with the surface 1f when the members are placed together.

In the lingual portion 2d of member 2 is provided a threaded hole 2b and the aforementioned countersunk receptacle or recess 2c, both extending coaxially from the surface 2f inwardly toward the buccal as shown in Figs. I and II. In the threaded hole 2b is secured the threaded shank 3b of the screw 3. The head 3a of the screw 3 is considerably larger than the threaded portion 3b and is adapted to fit the countersunk receptacle formed by the recesses 2c and 1d in order to prevent withdrawal of the member 2 from the member 1 at the open end of the recess in which the member 2 is positioned. Figs. II and III show a bridge mounted on natural, vital teeth, 4 and 5. These teeth are respectively provided with inlays 6 and 7. In the adjacent sides of these inlays are provided recesses 6a and 7a, respectively, in which socket members 1 are secured preferably by soldering. The artificial tooth 8, as shown, consists of an upper or outer metallic portion 8a, at the buccal and gingival ends of which is mounted a porcelain portion 8b. The metallic portion is provided at its opposite sides with vertical recesses 8c into which the male or plug members 2 are secured. These members 2 are preferably secured to the artificial tooth by soldering the same to the metallic portion 8a of the artificial tooth.

It will be here noted that the portions of the member 2, positioned in the socket members 1, may be tightly fitted in the latter, but the same are preferably loosely positioned therein so as to provide slight movement of the natural teeth and bridge in all directions. This loose fit may be provided by making the ridges 2a slightly smaller than the dovetail recess in the socket member, and the sides of the members 2 adjacent the socket members may be slightly beveled, if desired, to provide greater clearance. More or less movement of the bridge relative to the natural teeth may also be allowed by varying the relation between the wall of the recess 1d and the head; the wall of the recess may be made to fit snugly around the screw head 3a or it can be ground to allow any desired movement of the screw head within the recess.

Though I have described and shown a particular construction, combination and arrangements of parts and portions, I do not wish to be limited to this particular construction, combination and arrangement, nor to the modification, but desire to include in the scope of my invention the construction, combination and arrangement substantially as set forth in the appended claims.

Having thus described my invention, what I claim as new and desire to secure by Letters Patent is:

1. In a dental bridge, a socket member securable to a tooth, a male member securable to another tooth adapted to fit into said socket member, said socket member having a recess in its lingual wall, and a screw mounted in the male member on its lingual side and provided with a head with its outer side flush with the lingual side of said male member and extended into said recess in said socket member.

2. In a dental bridge, of the class wherein there is a natural and an artificial tooth, the combination of a socket member securable to one tooth, a male member securable to the other tooth, said socket member having a substantially dovetail recess and the male member having a substantially dovetail lug adapted to enter and to be retained in said recess, the lingual sides of the adjacent portions of said members being flush and substantially abutting at their edges, said socket member having a segmental recess extending inwardly from its lingual side and extending through the side abutting with the male member, and a screw secured in the male member inwardly from the lingual side thereof, said screw having a head countersunk in the lingual side of the male member, a segmental portion of the head extending into the segmental recess of the socket member for locking the two members together.

MERVYN C. LASKY.